United States Patent Office 3,219,857
Patented Nov. 23, 1965

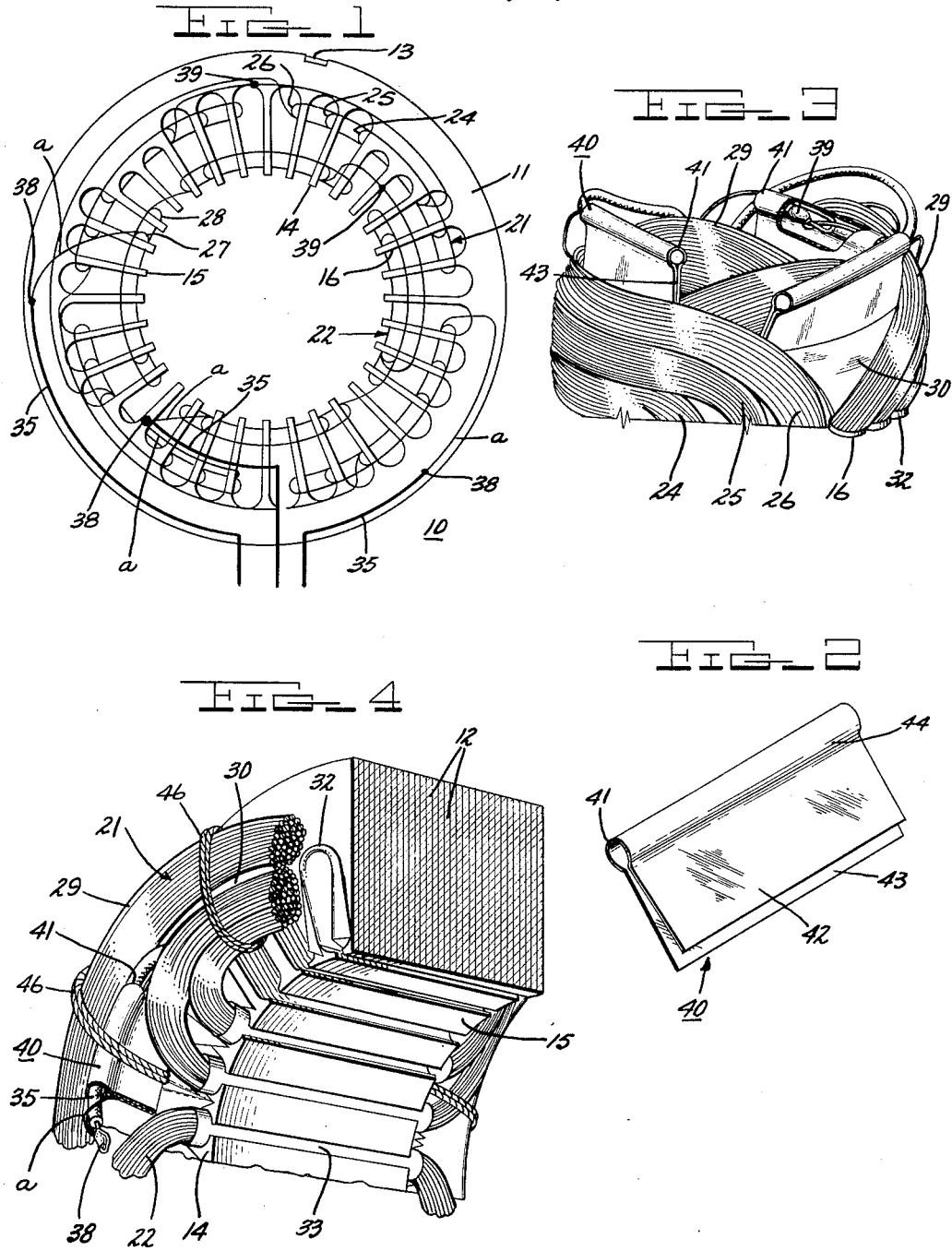

3,219,857
CONNECTION INSULATORS FOR DYNAMO-
ELECTRIC MACHINE WINDINGS
John C. Fisher, Holland, Mich., assignor to General
Electric Company, a corporation of New York
Filed July 31, 1963, Ser. No. 299,014
4 Claims. (Cl. 310—71)

This invention relates generally to connection insulators suitable for use in dynamoelectric machines, and more particularly to an improved winding connection insulator arrangement for stators.

In alternating current dynamoelectric machines, such as single and multi-phase induction motors, a number of phase windings are carried by a stator core composed of magnetic material. The winding phases are each normally formed of coils wound with suitable insulated wire conductors, such as magnet wire, the coils in turn defining circumferentially spaced apart opposed poles. Conventionally, the terminal ends of the windings are electrically connected to the bare ends of insulated or covered wire leads by twisting and then brazing the ends together to form a connection. It is also customary to similarly unite the ends of coils of a single phase in so-called interpole connections.

In order to electrically insulate these connections from the windings and other motor parts, it has been common practice to furnish a sleeve insulator for surrounding each connection, such as disclosed in the Hall et al. U.S. Patent No. 2,169,097, entitled "Dynamo-Electric Machine." These sleeves are normally slipped onto one of the wires before the joint or connection is made, and, after union of the wire ends, are then slid in place over the connection. To permit this assembly, the sleeve must be oversized, both as to diameter and length. That is to say, the cross-section of the connection is not a standard dimension, due in part to the brazing material, but is greater than that of the individual wires. Further, the exact length of the connection to be made is hard to determine accurately before hand. Consequently, the sleeve must be constructed oversized in both diameter and length to take into account these variable factors.

This approach, although widely used in the motor industry, has several deficiencies associated with its application. The approach is not only time consuming and expensive to practice from a labor cost standpoint, but in addition, the connections are not always satisfactorily covered and insulated by the sleeve. For instance, since the sleeve is slipped onto the free end of one of the windings to be connected and is oversized in length, it is not uncommon for the sleeve to be charred or otherwise damaged by the heat from the brazing torch during the brazing operation. Further, due to vibrations, handling and other causes, the sleeve being oversized in cross-section has a tendency to slide away from the connection to expose at least a part of the connection. Even the use of a large number of turns of cord wound around both the winding end turns, which project beyond the confines of the core, and the sleeve have not entirely solved this sliding problem. Moreover, sleeving does not permit much variance in the assembly technique.

Consequently, it is the general object of the present invention to provide an improved stator arrangement for dynamoelectric machines, including a winding connection insulator which overcomes the difficulties and deficiencies mentioned above.

It is a more specific object of the present invention to provide an improved stator having an electrical insulator for covering and protecting winding connections which is simple in construction, is easily assembled over the connection, and can be firmly anchored in place once assembled.

It is another object of the present invention to provide an improved electrical insulator arrangement for interpolar and winding-lead connections of an electric motor stator which permits versatility in assembly, ease of installation, and does not require supplemental means for holding the connection in its proper position once arranged onto the stator.

In carrying out the object of the present invention in one form, I provide a stator for use in an electric motor in which phase windings are arranged on the core, each winding being formed of poles defined by coils having end turns extending beyond the side faces of the core. These coils have interpole connections as well as terminal ends electrically joined to the bare ends of covered wire leads. Each connection is electrically isolated and protected by an elongated, flexible generally U-shaped, insulator comprising a generally round shaped bight section which substantially surrounds the connection. The bight section terminates in depending leg sections which are compressed tightly together and anchored within the confines of the winding end turns. This in turn forces the bight section in firm engagement with the connection serving to resist movemet of both the insulator and the connection relative to the windings. The insulators may be easily installed on the stator, merely by separating the leg sections to enlarge the bight section and placing the connection in the bight section. The leg sections are then inserted into the winding end turns, adjacent poles of the same phase, and compressed together to reduce the cross-section of the bight section by the end turns. Consequently, a firmly anchored and insulated connection is furnished with a great degree of economy.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a wiring diagram of a stator schematically showing windings typically arranged on the stator core and the interpole and external lead or winding terminal connections;

FIG. 2 is a view in perspective of the preferred form of the improved connection insulator of the present invention which may be employed to cover and protect the winding connections in the stator of FIG. 1;

FIG. 3 is a view in perspective, partially broken away, of the connectors shown in FIG. 2 as they are being assembled onto the stator after the winding connections of FIG. 1 have been made; and FIG. 4 is a view in perspective of a portion of the stator of FIG. 1, partially broken away to show detail, after it has been fabricated, the insulators installed and the winding end turns compacted and tied.

By way of exemplification, in the drawing the preferred embodiment of my invention is illustrated in connection with a stator 10 of the type employed in alternating current single phase induction electric motors. As shown, the stator comprises a core 11 conventionally fabricated from a pre-selected number of identical laminations 12 suitably punched out of relatively thin magnetic sheet material. The laminations are retained in stacked, juxtaposed, relation in the usual way, such as by welding transversely across the stack periphery or by cooperating grooves and keys indicated at 13. The core includes angularly spaced apart and aligned teeth 14, which terminate in a rotor receiving bore 15, and a number of spaced winding accommodating slots 16 therebetween. These slots accommodate two phase windings, generally indicated by numerals 21 and 22 in the figures.

As most clearly seen in the schematic representation of FIG. 1, winding 21 is the main or running winding in the exemplification having concentrically arranged coils 24, 25, and 26 on core 11 to form a number of opposed running poles. The other phase winding 22, an auxiliary or start winding, also comprises concentric coils, shown at 27 and 28, which are angularly displaced or displaced-in-phase from the coils of the main winding in the standard fashion. Each coil is formed of a number of turns of enameled or magnet wire, with windings 21 and 22 being electrically insulated one from the other by well-known between-phase insulation 30 both within the slots and at the end turns 29 which project from slots 16 beyond each side face of the core 11. The sides of each coil are suitably insulated from the walls of winding slots 16 by common slot liners 32 shown in FIG. 4. In addition, conventional slot wedges 33 close the slots at the bore and assist in retaining the winding coils within the slots 16.

The terminal ends of the windings, designated by letter "a," are electrically joined to the bare wire ends of covered wire leads 35 by any suitable means, such as brazed connection 38, the wires being twisted around each other and united by a brazing operation. These leads may be employed to connect the windings in parallel or series circuit relation with a suitable source of power through suitable switch means (not shown) in the manner well known in the art. The interpole connections for the coils of the various poles, which may also be achieved by brazing or the like, are identified by numeral 39 in the drawing.

In accordance with one form of the present invention, connections 38 and 39 are electrically insulated or isolated from the windings by an elongated, flexible, somewhat U shaped insulator member 40. FIG. 2 shows the preferred embodiment of the insulator, formed from relatively thin, suitable electrically insulating material, such as a rectangular sheet of resilient polyethylene terephthalate (known as "Mylar"). For most applications a thickness of 7½ mils is sufficient to provide the requisite insulation and flexibility properties. As illustrated, member 40 comprises a bight section 41 having a curved or arcuate configuration in cross-section, preferably surrounding the connection for approximately 360° so as to engage various portions of the irregular circumference of the connection in a clamping fashion. At each of its ends, section 41 terminates in depending planar leg sections 42 and 43, normally biased apart in the manner shown in FIG. 2, which project into the confines of the winding end turns 29 axially toward the sides of the core and are forced tightly together by the pressure applied on the leg sides by the end turn mass (FIG. 4). Due to this frictional engagement experienced between the end turns and leg sections, the sections are anchored firmly in place. Furthermore, the interaction of the normally biased apart legs, which are forced together to overcome the spring like bias, and the bight section held generally in an annulus, frictionally surrounding the connection, produce in effect a grabbing or retaining action on the encompassed connection. The ideal height of the leg sections for a given application will be primarily dependent upon the mass of the end turns 29.

Since in the exemplification three connections are made on one side of the core (see FIG. 3) and two are disposed on the other side, it is convenient to locate the insulator leg sections 41, 42 between the end turns of the two phase windings 21, 22, which are in overlapping relation, with the sections extending from one pole to the adjacent pole of the same phase winding. In view of the resiliency of the material, flexible member 40 will generally conform to the circumferential configuration of the end turns at that location. This arrangement permits the bight section 41 and associated connection to reside next to the windings and phase insulators 31 in the crevice formed between the phase windings for additional protection. As previously explained, the end turns firmly hold the leg sections 42, 43 (and thus bight section 41) stationary relative to the windings, the bight section isolating the surrounded connection and retaining it firmly in place on the stator. In those situations requiring greater insulation than that provided by a single thickness of member 40, it will be appreciated that two identical members may be readily employed in telescoping relation over the connection without uniting the insulators into a single unit by adhesive or the like. This double insulator arrangement has an additional advantage in that the outer insulator tends to compress the bight section of the inner member in the vicinity of the fold (44 in FIG. 2), which joins that section with leg sections 42, 43, augmenting the compression provided by the end turns.

Insulator members 40 may be easily and quickly installed during the fabrication of the stator 10 at any time after connections 38, 39 have been made but prior to the time that the end turns are formed and shaped into a compact mass, if such is desired. After windings 21 and 22, phase insulators 32, and slot wedges 33, have been arranged on the core 11, electrical connections 38 and 39 are completed, as by the brazing operation previously mentioned. Leg sections 42 and 43 are spread apart or expanded by the assembler, increasing the cross-section area defined within bight section 41, and the legs are then drawn over the connection in question, one on either side, until the connection is disposed within the bight section. The winding end turns are separated slightly to receive leg sections 42, 43 which are then inserted therein as illustrated in FIG. 3. The winding end turns exert pressure on the side of the leg sections, holding them together, which in turn reduces the cross-section area of the bight section such that it is clamped firmly around the connection, preferably a circumferential length of substantially 360°. In other words, the flexibility of member 40 and the forcing together of the legs closes the bight section, drawing it tightly around the connection, which is confined therein. The height of the leg sections may be of differing dimensions, if desired, to facilitate the separation of the leg sections during this step of assembly.

With all the insulator members 40 in place, cord 46 is then wrapped around the end turn mass primarily for the purpose of holding the end turns of both windings together in a unitary mass. The present invention permits a reduction in the number of turns of cord needed as compared with prior arrangements. Finally, if desired, the and turns may be shaped and compacted. This operation, by way of example, may be accomplished in accordance with the disclosure and claimed subject matter of Patent No. 2,980,157, issued July 20, 1959 to Alvin L. Rediger and assigned to the General Electric Company. FIG. 4 shows a portion of the tied end turns which have been compacted. This compacting operation increases the pressure applied on the leg sections by the end turns, insuring a closed or annular bight section.

It will be appreciated from the foregoing that the present invention provides an improved connection insulator for dynamoelectric machine windings which is simple of construction and easily installed over the connection. In addition, the insulator resists movement away from its position surrounding the connection by being firmly anchored in place, and insures complete electrical isolation of the connections. Furthermore, the present invention permits versatility in stator assembly procedures while providing economy in its use.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. An inductive core for use in an electrical inductive device including at least one winding arranged thereon composed of wire conductors having end turns projecting beyond each side face of the core, connection means electrically joining at least one terminal end of said winding to a wire conductor lead externally of said end turns, at least one flexible insulator member formed from a sheet of flexible electrically insulating material arranged over and surrounding said connection means for isolation thereof, said member comprising a curved section frictionally engaging said connection means and at least one depending leg section extending from said curved section into said winding end turns, said end turns applying pressure to the sides of said leg section for anchoring said section firmly therein whereby said member electrically insulates and resists movement of said connection means relative to said winding.

2. A stator for use in a dynamoelectric machine comprising a magnetic core, at least one winding arranged on said core including a number of coils composed of wire conductors, having end turns projecting beyond each side face of the core, connection means electrically joining the terminal ends of said winding to the ends of wire conductors externally of said winding, a flexible electrical insulator member arranged over at least one of said connection means, said member comprising a bight section generally arcuate shaped in cross-section accommodating said connection means adjacent to the peripheral surface of said end turns and a pair of depending leg sections extending from said bight section into said winding end turns, said leg sections being flexible to permit their separation to insert said connection means into said bight section, said end turns clamping said leg sections firmly together and anchoring said leg sections therein whereby said member electrically insulates and resists movement of said connection means relative to said winding.

3. A stator for use in an elecric motor comprising a magnetic core, windings arranged on said core to form a plurality of poles having coils composed of wire conductors, said windings including a number of interpole connection means with the coils having end turns projecting beyond each side face of the core, connection means electrically joining wire conductor leads to the terminal ends of said winding adjacent the outer surface of the end turns, elongated flexible insulator members formed from a sheet of flexible electrically insulating material arranged over at least said interpole connection means for isolation thereof, said members each comprising a bight section generally arcuate shaped in cross-section accomodating said connection means and a pair of depending leg sections extending from said bight section into said winding end turns, said end turns compressing the sides of said leg sections firmly together whereby said members electrically insulate and resist movement of said connection means accommodated therein relative to said windings.

4. A stator for use in an electric motor comprising a magnetic core, a pair of phase windings arranged on said core to form a plurality of poles having coils composed of wire conductors, said coils having end turns projecting beyond each side face of the core, with the end turns of one winding overlapping the end turns of the other winding, connection means electrically joining to wire conductor leads to the terminal ends of said windings adjacent the outer surface of the end turns, elongated flexible insulator members formed from a sheet of flexible electrically insulating material arranged over said connection means for isolation thereof, said members each comprising a bight section surrounding and frictionally engaging said connection means and a pair of depending leg sections projecting from said bight section into said winding end turns, said leg sections positioned between the overlapping end turns of said phase windings and extending between adjacent poles of one winding, said end turns applying pressure to the sides of said leg sections for holding said sections firmly together whereby said member electrically insulate and resist movement of said connection means accommodated therein relative to said windings.

References Cited by the Examiner
UNITED STATES PATENTS

| 2,169,097 | 8/1939 | Hall et al. | 310—45 |
| 2,184,342 | 12/1939 | Grupe et al. | 336—192 |
| 2,534,119 | 12/1950 | Gethmann | 336—192 |

ORIS L. RADER, *Primary Examiner.*

MILTON O. HIRSHFIELD, *Examiner.*